Figure 1:
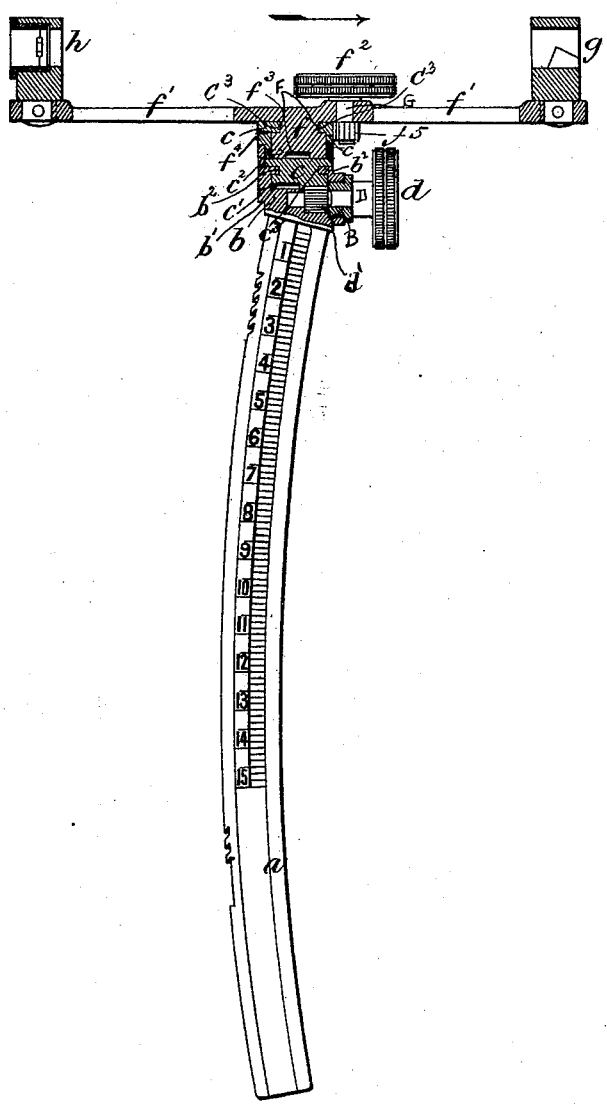

(No Model.)

6 Sheets—Sheet 1.

H. H. GRENFELL.
SIGHT FOR ORDNANCE.

No. 418,789.

Patented Jan. 7, 1890.

Witnesses
Baltus DeLong
Robt W Abert

Inventor
Hubert Henry Grenfell,
By his Attys
Baldwin Davidson & Wright (No Model.) 6 Sheets—Sheet 2.
H. H. GRENFELL.
SIGHT FOR ORDNANCE.

No. 418,789. Patented Jan. 7, 1890.

Witnesses
Baltus De Long.
Robt. W. Abert

Inventor
Hubert Henry Grenfell
By his Attys.
Baldwin Davidson & Wight (No Model.) 6 Sheets—Sheet 3.

H. H. GRENFELL.
SIGHT FOR ORDNANCE.

No. 418,789. Patented Jan. 7, 1890.

Witnesses
Baltus D. Long
Robt. W. Abert

Inventor
Hubert Henry Grenfell
By his Atty's.
Baldwin Davidson & Wight (No Model.) 6 Sheets—Sheet 4.
H. H. GRENFELL.
SIGHT FOR ORDNANCE.
No. 418,789. Patented Jan. 7, 1890.
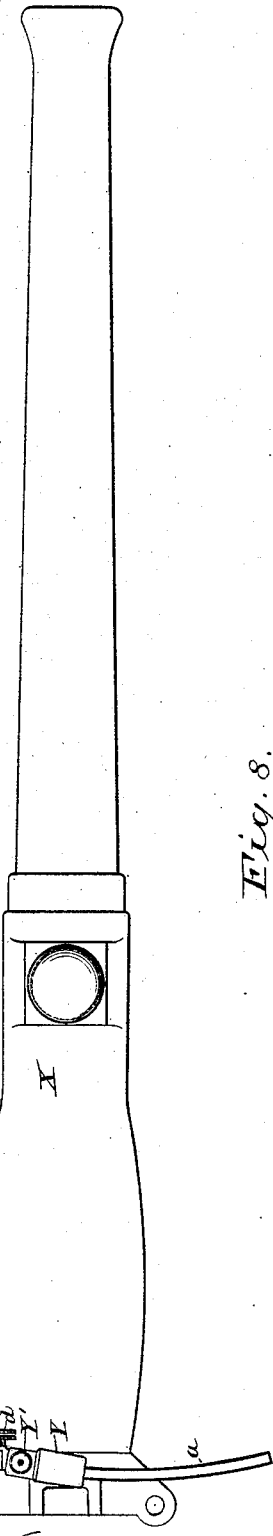
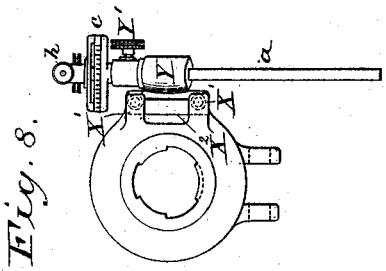
Witnesses
H. C. Newman
E. S. Newman
Inventor
Hubert H. Grenfell
By his Attorneys
Baldwin Davidson & Wight

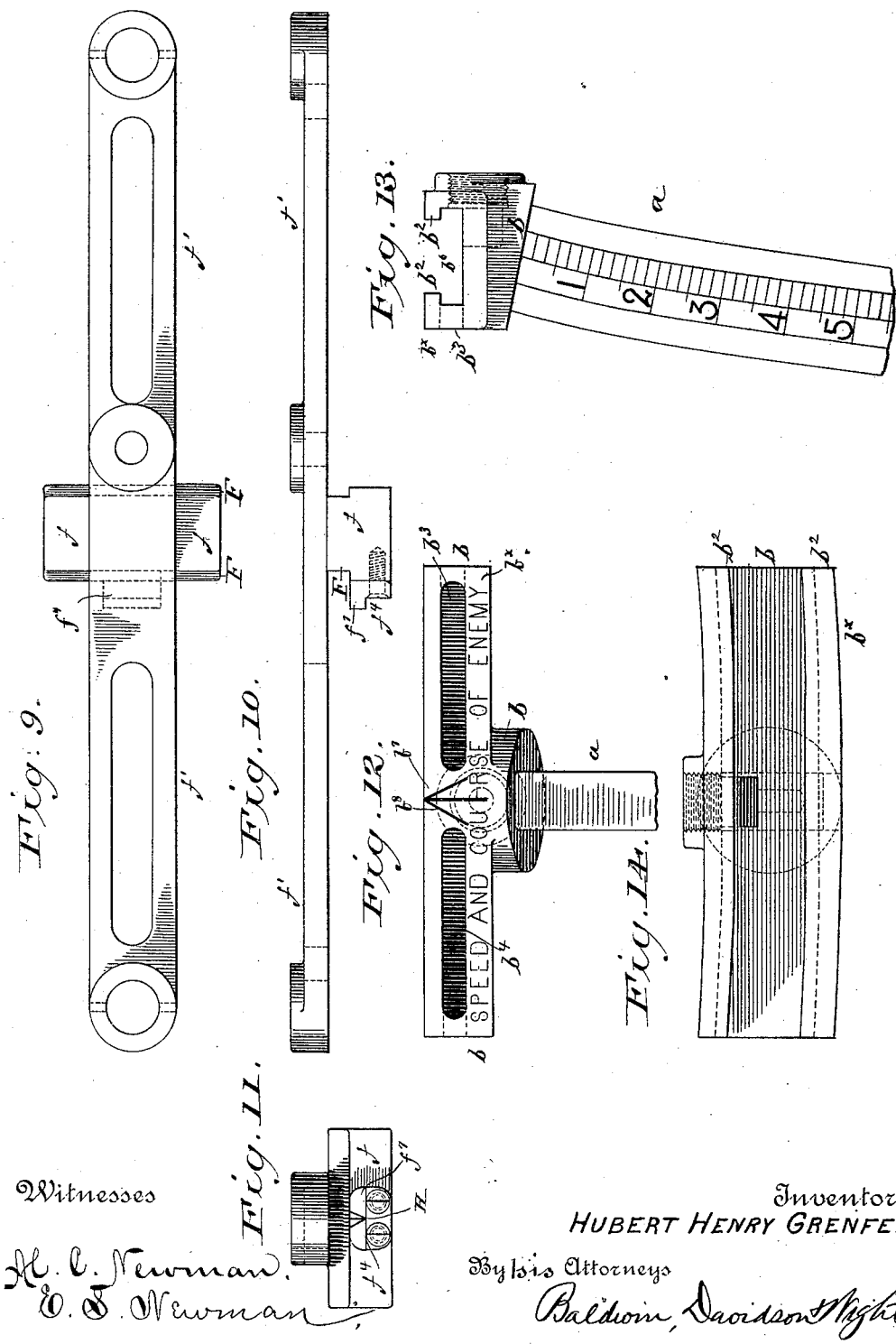

(No Model.) 6 Sheets—Sheet 6.

H. H. GRENFELL.
SIGHT FOR ORDNANCE.

No. 418,789. Patented Jan. 7, 1890.

Witnesses
H. C. Newman
C. F. Newman

Inventor
HUBERT HENRY GRENFELL,
By his Attorneys
Baldwin, Davidson & Wight

UNITED STATES PATENT OFFICE.

HUBERT HENRY GRENFELL, OF NEWCASTLE-UPON-TYNE, ENGLAND, ASSIGNOR TO SIR W. G. ARMSTRONG, MITCHELL & CO., (LIMITED,) OF SAME PLACE.

SIGHT FOR ORDNANCE.

SPECIFICATION forming part of Letters Patent No. 418,789, dated January 7, 1890.

Application filed January 17, 1889. Serial No. 296,592. (No model.)

*To all whom it may concern:*

Be it known that I, HUBERT HENRY GRENFELL, captain, Royal Navy, a subject of the Queen of Great Britain, residing at Elswick Works, Newcastle-on-Tyne, England, have invented certain new and useful Improvements in Apparatus for Aiming or Directing Ordnance, of which the following is a specification.

My invention more especially relates to that class of heavy ordnance used on ships or other movable objects, but is also well suited for guns mounted in forts or elsewhere.

The object of the first part of my invention is to allow the gun to be quickly and accurately aimed with due regard to the variations of range or distance of the object fired at, to drift or wind, and to the movement of either the gun itself or the object aimed at.

To these ends one part of my invention consists in mounting upon the gun a curved vertically-adjustable support or stem, carrying a horizontally-adjustable slide, upon which the sight-bar and its sight-piece or sight-pieces are mounted.

The object of the next part of my invention is so to organize the apparatus that a definite movement of the vertically-adjustable supporting-stem in its guide throughout its entire length will give a corresponding increase in the range of the gun, notwithstanding the differences in the trajectory of the projectile at different elevations, which end I attain by giving to the stem a curve, the rapidity of which increases in proportion to the elevation, according to the well-known laws of projectiles.

The object of the next part of my invention is to enable the gunner readily to ascertain the adjustment of the sights, which end I attain, first, by combining with a sight-supporting slide an indicator which will show its adjustment.

The subject-matter claimed is hereinafter specified.

According to this invention the inclination of the line of sight to the axis of the gun or line of fire is adjusted, not, as is usual, by moving one of the sight-points relatively to the other, but by the movement through a socket or guide of a curved stem or support on which one at least of the sights is carried. In this manner both the vertical and lateral directions are obtained. The sights are preferably carried upon a single support in the form of an arc working in a guide fixed to or moving with the gun, in correspondence with which movement the line of sight is inclined in a vertical plane more or less to the axis of the gun.

In order to allow the gun to be inclined in a horizontal plane to the line of sight to allow for wind or drift, the sights are mounted on a curved slide working in a corresponding guide carried by the vertically-adjustable stem, and the rack and pinion are provided to traverse the slide along the guide. In order to compensate the movement of the gun or object when either or both of them are moving, in place of fixing the last-mentioned guide directly to the curved support I make it in the form of a curved stem or support movable by a rack and pinion in a correspondingly-curved guide on the support. All these slides are graduated.

The accompanying drawings represent all my improvements as embodied in one apparatus in the best way now known to me. Some of these may, however, be used without the others, and in an apparatus differing somewhat in its details of construction from that herein shown.

Figure 2:
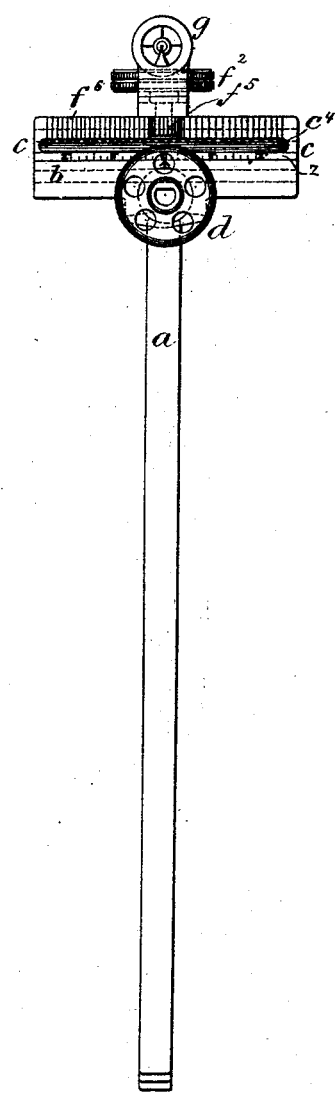
Figure 3:
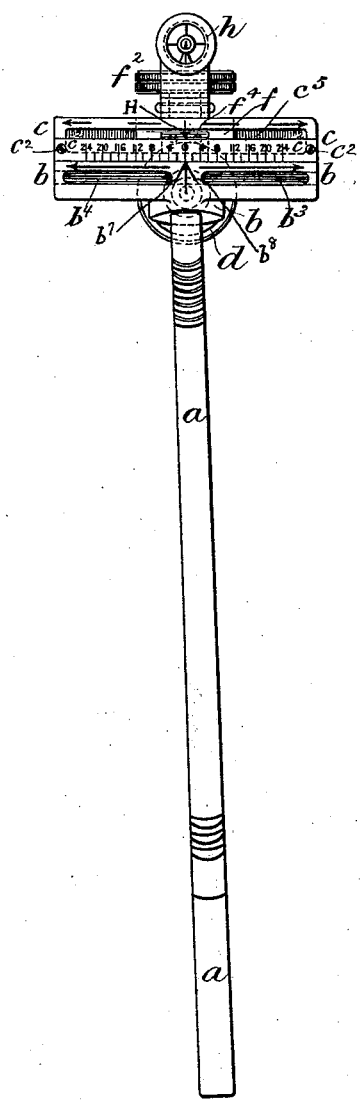
Figure 4:
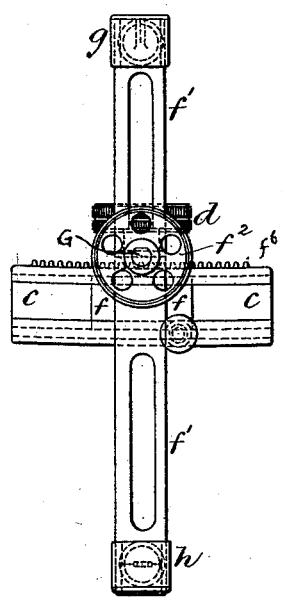
Figure 5:
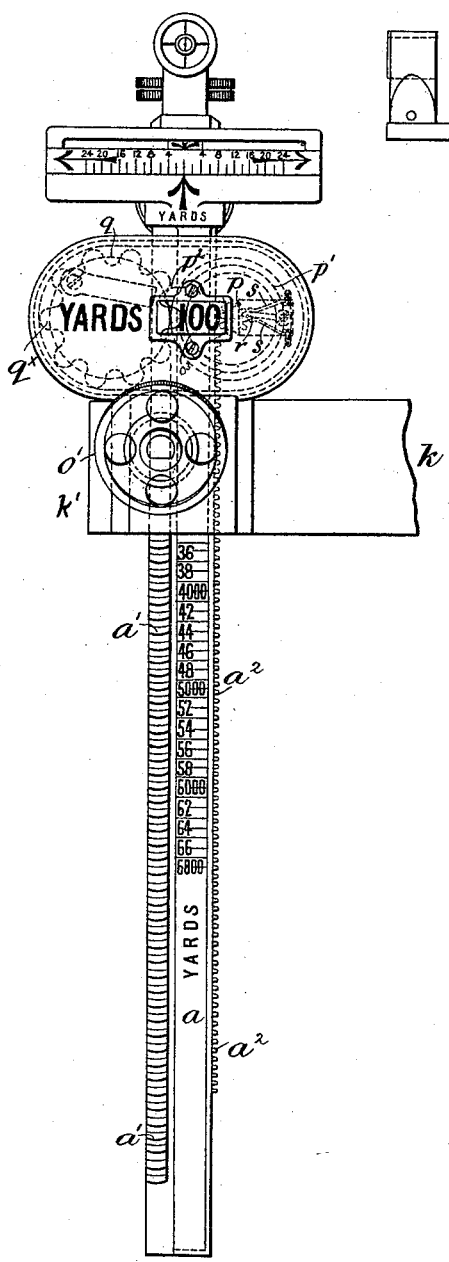
Figure 6:
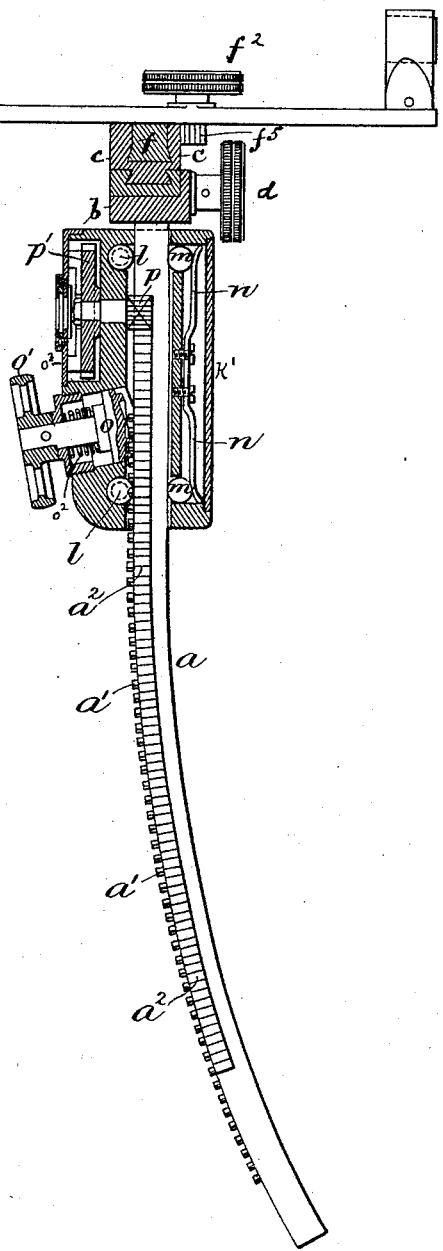
Figure 15:
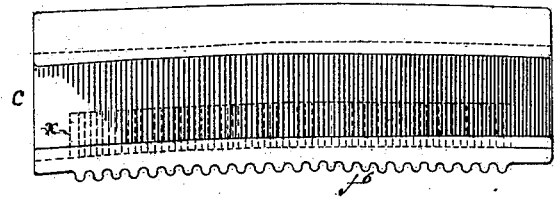
Figure 16:
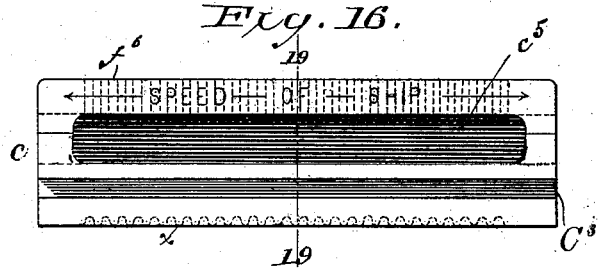
Figure 19:
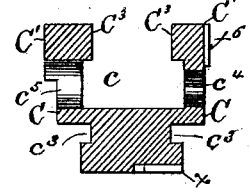
Figure 17:
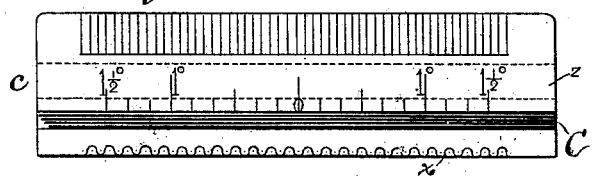
Figure 18:
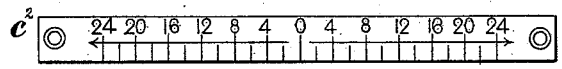

Figure 1 is a side elevation, partly in section, of my improved sight apparatus. Fig. 2 is a front elevation of the same; Fig. 3, a rear elevation; Fig. 4, a plan view of the same; Fig. 5, a rear elevation of a modified form of the apparatus, with an indicator attached; Fig. 6, a side elevation, partly in section, of the same. Fig. 7 is a side elevation of a gun with my improvements applied, and Fig. 8 is a rear elevation of the same. Fig. 9 is a plan view of the sight-bar detached. Fig. 10 is a side elevation of the same. Fig. 11 is an end view of the same. Fig. 12 is an end view of the upper part of the support or stem and its head. Fig. 13 is a side view of the same. Fig. 14 is a plan view of the head of the support or stem. Fig. 15 is a plan view of the slide to which the sight-bar is secured, and which moves in guides in the head of the support or stem. Fig. 16 is a rear view of the same with the scale-bar detached; Fig. 17, a front view of the same. Fig. 18 is a detail view of the scale-bar, which is attached to the rear end of the slide; and Fig. 19 is a vertical central section on the slide on the line 19 19 of Fig. 16.

Figs. 1, 2, and 3 of the drawings show a curved support or stem $a$, graduated to degrees and parts of degrees and of such curvature that the graduations are sufficiently open to be very readily seen. This stem can be raised and lowered in a suitably-formed guide or socket either fixed upon or so geared or connected with the gun that they both move together. One form of this guide is shown in Fig. 6; another in Figs. 7 and 8. The support or stem $a$ is provided at its upper end with a head $b$, forming a guide on which the bar-slide $c$ traverses, both guide and bar-slide being correspondingly curved in the arc of a circle of large radius.

The preferred way of forming the head $b$ is shown in detail in Figs. 12, 13, and 14. As shown, it consists of a long narrow bar $b$, having a longitudinal groove $b^6$, the side $b^\times$ being slotted or grooved at $b^3$ and $b^4$ to reduce friction on the bar-slide $c$. Inwardly-projecting flanges $b^2 b^2$ extend into corresponding grooves $c^3 c^3$ in the lower end of the slide $c$. The side $b^\times$ of the head $b$ is made solid at $b^7$, and is provided with an index or pointer $b^8$. The slide $c$ is formed with a row of teeth $x$ on its under side, with which engages a pinion $d'$ on a shaft D, carrying a milled head $d$. The shaft D extends through a thimble or bushing B, which is screw-threaded and secured to the front side of the head $b$. A spring $c'$, seated in a recess in the under side of the slide $c$, bears on the head $b$, and affords a convenient amount of friction to insure the proper working of the slide. The slide $c$ is formed with laterally-projecting flanges C C, from which extend upwardly the upper side pieces C' C'. On the rear side the upper side piece is slotted at $c^5$, and on the front the upper side piece may be slotted at $c^4$, as shown in Figs. 1, 2, and 19, or solid, as shown in Fig. 17. A scale-bar $c^2$ (shown detached in Fig. 18) is secured to the rear side of the slide $c$ by screws $C^2$, as shown in Fig. 3, and partially covers the slot $c^5$. A scale $z$ is formed on the front side of the slide $c$ below the slot $c^4$, or, immediately below the teeth $f^6$, formed on the upper edge of the front of the slide $c$.

The sight-bar consists of arms $f' f'$, projecting in opposite directions from a laterally-projecting foot piece or slide $f$, which is seated in a guide in the slide $c$. This guide is shown as formed by the upper side pieces C' C', which have inwardly-projecting flanges $C^3 C^3$, entering corresponding grooves F F in the foot $f$. A spring $f^3$ in a recess in the bottom of the foot-piece $f$ bears upon the slide $c$ and gives a convenient amount of friction.

The fore sight $g$ and back sight $h$ are mounted, respectively, on the front and rear ends of the sight-bar. A shaft G, carrying at its upper end a milled head $f^2$ and at its lower end a pinion $f^5$, extends through the sight-bar, and the pinion $f^5$ engages with teeth $f^6$ on the slide $c$. By operating the milled head $f^2$ the sight-bar may be adjusted relatively to the slide $c$. The foot $f$ and its guide in the slide $c$ are curved in the arc of a large radius, as shown in Figs. 4 and 15.

A block $f^4$, having a forwardly-projecting flange $f^7$, is secured to the foot $f$, as shown in Figs. 1, 10, and 11, and is provided with an index or pointer H, which points to the scale $c^2$, as shown in Fig. 3. An index $b^8$ on the head $b$ also points to the same scale, which scale is used to make adjustments rendered necessary by the movement of the ship or object. Each adjustment may be separately made, thereby avoiding errors. Thus the stem $a$ is raised in its socket to give the elevation due to the range. The drift and wind are allowed for on the front scale, Fig. 2. An allowance for speed is made by separately traversing the indices along the scale $c^2$, which is done by adjusting the slide $c$ on the head $b$ and adjusting the bar $f'$ on the slide $c$.

In the sight shown by the drawings, the scale on the stem $a$ is equally graduated to show angles of elevation; but my invention enables me to employ an equally-graduated scale to show the distance or range for which the sight is set. For this purpose, instead of curving the stem $a$ in the arc of a circle of large radius, as shown in Figs. 1, 2, and 3, the stem is made of a curvature increasing from the head downward. In that part of the bar which controls the position of the sight-points at short ranges, where the trajectory is flat, the curvature is slow, so that then the movement of the bar a step of the scale up or down in its socket or guide changes only to a small extent the inclination of the line of sight to the axis of the gun; but that part of the bar which controls the position of the sight-points at long ranges, where the trajectory is more curved, is made with a more rapid curvature, so that at long ranges the movement of the bar a step up or down makes a greater change than before in the inclination of the line of sight to the axis of the gun. The curvature and the graduations are made such that each step of a scale of equal parts corresponds to a certain number—say one hundred—yards increase or decrease of range. The graduations may be of any size which may be preferred, and the apparatus as a whole may be made to a larger or a smaller scale, as may be desired.

The arrangement of the apparatus so that the sight-bar $a$ is moved equal distances for equal increments of range leads to a further improvement. The sight can now be provided with a range-indicator, which shows by bold figures the range to which the sight is set. The range-indicator is a counter consisting of two wheels, with figures marked upon them from 0 to 9. One wheel is the hundreds-wheel, the other the thousands. These wheels are geared together, so that as the hundreds-wheel completes its rotation the thousands-wheel moves a tenth of a rotation and passes from one figure to the next. A rack on the sight-bar drives the hundreds-wheel so that it makes a complete rotation, while the bar is moved a distance corresponding to a thousand-yards change of range.

Fig. 5 is a rear elevation, and Fig. 6 is a side view, partly in section, of a sight similar to that already described, except that the arc is graduated with a range-scale of equal parts, and its curvature is such as to admit of this. The range-indicator is also applied.

$k$ is the bracket by which the sight apparatus is held. It terminates in a box or socket $k'$, through which the arc $a$ slides.

$l\ l$ are two small rollers at the back of the arc, and $m\ m$ are other similar rollers, which are caused to bear against the front face of the arc by the spring $n$, so that the arc is held steadily between these rollers. On the rear face of the arc are curved teeth $a'\ a'$, adapted to be engaged by a scroll-thread on the face of the disk $o$, which can be turned by the milled head $o'$ to raise and lower the arc $a$ in the socket $k'$. The disk is pressed forward by a coiled spring $o^2$, and it can, when desired, be drawn back out of gear to admit of a rapid movement up and down. $a^2 a^2$ are other teeth upon the arc $a$. They engage with a pinion $p$, which is upon the same axis with a wheel or disk $p'$. This wheel or disk has the ten numerals marked around its periphery. In Fig. 5 the numeral 1 is visible through an aperture in the case. The ciphers seen in Fig. 5, following the numeral, are marked on the case $o^3$ and never alter their position. The wheel or disk $p'$ has a tooth $p^2$, and this tooth, each time that a rotation is completed, turns another similar wheel or disk $q$ through a small space by engaging with one or other of the teeth $q^x$, with which this wheel is provided. This wheel also has numerals upon it which appear in turn at the aperture in the casing. The part of this wheel or disk visible in Fig. 5 is blank; but when the wheel moves a step the numeral 1 will appear, and the next step will bring 2 into sight, and so on, this wheel indicating thousands of yards.

$r$ is a small blade resting upon the teeth of the pinion $p$. It is held between two springs $s\ s$. As each tooth of the pinion passes the blade it gives an audible click and by counting these the marksman will know without looking at the indication by how many hundreds of yards he has altered setting of the sight. This is especially advantageous at night, or when there may be difficulty in seeing the indicator.

My invention is in part applicable where the sight-bar carries one only of the sight-points.

In Figs. 7 and 8, I have illustrated one way of applying or securing my improvements to a gun. In this instance the socket piece or guide Y, through which the stem $a$ extends, is shown as formed with an extension $X^2$, which is secured to lugs $X'$ on the rear end of the gun X. The socket piece or guide may be adjusted on the stem by means of the set-screw $Y'$.

In adjusting the sight the first thing done would be to slide the stem $a$ up through the socket Y, as shown in Figs. 7 and 8, to a height suitable to the distance of the object to be fired at. When the stem $a$ is properly placed, it is clamped by means of the clamping-screw $Y'$ on the socket Y. Then the gunner will look at the fore side of the sight, as seen in Fig. 2, and by turning the button $d$ he will move the slide $c$ as many divisions of the scale as he may consider necessary to correct "wind" and "drift," or the deviation due to the direction of the rifling. Next, if the ship carrying the gun be in movement, the gunner, looking at the rear side of the sight, Fig. 3, and turning the button $f^2$, will move the index $f^4$ as far as he may consider necessary to compensate for the movement of the ship. Finally, the gunner, still looking at the rear of the sight, Fig. 3, will, by turning the button $d$, traverse the scale $c^2$ past the lower index on the part $b$ as far as he may judge necessary to compensate the speed of the enemy's ship, if the same be in movement.

The order in which the adjustments are made is not necessarily that stated above. For example, it may be necessary the last thing before firing to correct either the elevation or one or other of the speed allowances. These adjustments are, of course, to a certain extent interdependent, but nevertheless it is often desirable to make the adjustments separately.

Among the advantages which my invention presents are the following:

First. The graduations of the sight may be of the most convenient dimensions.

Second. The graduations representing equal increments of range may be equal size all along the scale.

Third. An indicator showing by bold figures the range to which the sight is set may be applied.

Fourth. A turn of the milled head which moves the sight-bar will always correspond to the same number of yards alteration in the range.

Having thus described my apparatus for aiming ordnance, what I claim therein as new, and desire to secure by Letters Patent, is—

1. The combination, substantially as hereinbefore set forth, of a gun, a sight-piece, and a curved slide on which the sight-piece is mounted, adjustable in an arc horizontally relatively to the axis of the gun.

2. The combination, substantially as hereinbefore set forth, of the curved vertically-adjustable support or stem, and the sight-bar carrying front and rear sights and horizontally adjustable on the support.

3. The combination, substantially as hereinbefore set forth, of a curved vertically-adjustable support or stem, a curved horizontally-adjustable bar-slide thereon, a sight-bar carried by the horizontally-adjustable slide, and a sight on the sight-bar.

4. The combination, substantially as hereinbefore set forth, of a vertically-adjustable stem increasing in curvature downward, a sight-bar mounted thereon, and a sight-piece on the sight-bar.

5. The combination, substantially as hereinbefore set forth, of a vertically-adjustable sight-bar, a support therefor, and a range-indicator, substantially such as described, geared therewith.

6. The combination, substantially as hereinbefore set forth, of a vertically-adjustable support or stem, a sight-bar carried thereby, a sight-piece thereon, a rotary range-indicator, and gearing connecting it with the vertically-adjustable stem.

7. The combination, substantially as hereinbefore set forth, of a guide, a stem increasing in curvature downward and adjustable vertically therein, a horizontally-adjustable sight-bar mounted thereon, its sight-pieces, and a range-indicator geared therewith.

8. The combination, substantially as hereinbefore set forth, of the gun, a guide or socket thereon, a sight-piece, the stem on which it is mounted and which is adjustable vertically in the socket, and a range-indicator connected with and moved by the stem.

HUBERT HENRY GRENFELL.

Witnesses:
WM. JOHN GREY,
J. RANKIN.